United States Patent [19]

Raynaud et al.

[11] Patent Number: 4,943,000

[45] Date of Patent: Jul. 24, 1990

[54] METHOD OF BRAZING ALUMINUM ALLOYS WITHOUT FILLER METAL

[75] Inventors: Guy-Michel Raynaud, Saint Egreve; Louis Realis, Charavines; Didier Constant, Saint Egreve, all of France

[73] Assignee: Cegedur Societe de Transformation de L'Aluminum Pechiney, Paris, France

[21] Appl. No.: 133,883

[22] Filed: Dec. 16, 1987

[30] Foreign Application Priority Data

Dec. 16, 1986 [FR] France ................. 86 18454

[51] Int. Cl.$^5$ ............................................. B23K 20/00
[52] U.S. Cl. ................................... 228/193; 228/231; 228/232; 228/234; 228/239
[58] Field of Search ............... 228/193, 231, 232, 234, 228/263.17, 194, 195, 239, 198

[56] References Cited

U.S. PATENT DOCUMENTS

| | | | |
|---|---|---|---|
| 4,141,482 | 2/1979 | Reynolds | 228/232 |
| 4,586,964 | 3/1986 | Finnegan et al. | 228/263.17 |
| 4,626,295 | 12/1986 | Sasaki et al. | 228/263.17 |
| 4,695,699 | 9/1987 | Yagii et al. | 228/193 |
| 4,699,310 | 10/1987 | Kohno et al. | 228/234 |
| 4,717,068 | 1/1988 | Meyer | 228/263.17 |
| 4,722,469 | 2/1988 | Rydstad et al. | 228/193 |

FOREIGN PATENT DOCUMENTS 865658 4/1981 United Kingdom ............... 228/232

OTHER PUBLICATIONS

"Preheating for Welding", The Welding Journal, 4/77.
Tempil Preheating Chart, 1941.

Primary Examiner—Nicholas P. Godici
Assistant Examiner—Karen Skillman
Attorney, Agent, or Firm—Dennison, Meserole, Pollack & Scheiner

[57] ABSTRACT

A method is disclosed for brazing without filler metal two components, of which at least one is an Al alloy. According to the method, prior to brazing, at least one Al alloy component is maintained in a region of temperatures included between the temperature of solvus $T_v$ of the alloy and 2/5 of temperature of fusion (solidus) $T_s$ of the alloy, expressed in degrees Kelvin, for a sufficient period of time. After this treatment, which may or may not be isothermal, the alloy is suitable for brazing in a domain of temperatures included between the temperature of fusion $T_e$ of the most fusible eutectic corresponding to the equilibrium diagram of the constituents of the alloy, and that of the solidus of the alloy. The method permits the realization of perfectly homogeneous brazed seams for alloys considered not to be brazable.

9 Claims, 2 Drawing Sheets

25μm

25μm

5µm

25µm

METHOD OF BRAZING ALUMINUM ALLOYS WITHOUT FILLER METAL

The invention relates to a method of brazing, without filler metal, of two components of which at least one is of Al alloy.

It is known that brazing is carried out by the interposition between the two components to be assembled of a filler metal whose fusion temperature is lower than that of the two components under consideration. For example, as concerns alloys of Al, the brazable alloys as well as the brazing alloys generally used are described in Metals Handbook, 9th Edition, 1983, page 1023.

Nevertheless, the addition of filler metal in brazing constitutes a supplementary and costly operation, which it would be important, from the point of view of economy, to omit. Increasingly, in the realization of brazed assemblages of high geometric precision such as, for example, in the realization of waveguides, the thickness of the brazed seam must be controlled with great precision.

Indeed, filler alloy is generally supplied: whether in independent form, (ribbon, wire, powders, etc . . . ) between the two surfaces to be brazed with the necessary clearance, or whether in a form associated with the metal to be assembled, that is to say metallurgically bound to one of the components, in the form of plating obtained for example by co-rolling In the two cases, the filler metal represents a relatively important thickness which limits the geometric precision of the assemblage obtained.

The problem which is presented to the person skilled in the art is thus, on the one hand, the obtaining of a brazed joint between two components, without the interposition of a filler alloy, and, on the other hand, the obtaining of a brazed joint between two components, of which at least one is an alloy of Al considered not to be brazable.

The process according to the invention consists in bringing, before the brazing cycle properly speaking, at least one piece of alloy of Al considered in the domain of temperatures included between the temperature of solves $T_v$ of the alloy and 2/5 of the temperature of fusion (solidus) $T_s$ of the alloy, expressed in Kelvin, for a minimum period of time.

This minimum period is equal to or greater than the shortest time corresponding to the cus of the TTP curves of the alloy considered, in a graph of temperature—log of time; the property P is either the mechanical characteristic of traction, or the sensitivity to corrosion. These TTP curves are either known from the technical literature, or experimentally determinable. The period is preferably held equal to or greater than the smaller of the periods determined by the two TTP curves themselves, as defined above.

The treatment is not necessarily isothermal—in practice the piece is heated to a temperature greater than 2/5 $T_s$ and is allowed to cool down again at such a speed that the piece will be between T and 2/5 $T_s$ over a period greater than the minimum required.

For temperatures greater than the maximum claimed or times lower than the minimum claimed, it has been confirmed that brazing is either impossible to obtain or random. For temperatures lower than the minimum claimed, the treatment times become excessive, which takes away all practical interest from the process.

This treatment may be carried out at any one stage of the sequence of operations which precedes the operation of brazing itself, provided that the temperature does not surpass the maximum temperature claimed before brazing. Nevertheless, it is preferable to carry out this treatment immediately after a treatment of putting in solution, in order to obtain a clearly supersaturated solution. This treatment may equally be brought about preferably immediately before the operation of brazing, for example in the course of heating to the temperature of brazing. This treatment may be carried out in any atmosphere: air, inert gas or vacuum. Nevertheless, in this last medium it has been confirmed that with the alloys of the series 5000 and 7000, following the designation of the Aluminum Association, the results of brazing are relatively less good.

An alloy of Al thus treated, whether isothermally, or in any manner in the domain claimed, is appropriate for brazing without filler metal on to another component, bringing the assemblage to a region of temperatures included within the temperature of fusion $T_E$ of the most fusible eutectic corresponding to the equilibrium diagram of the constituents of this alloy and that of the solidus of the alloy.

The welding of the components to be assembled may be carried out with or without the help of pressure or of strain on the joint to be carried out: a good geometrical junction of the surfaces to be assembled is necessary. After brazing, the assemblage may undergo a treatment of putting into metallurgical solution.

The process of the invention permits, at the time of brazing, the obtaining of joints of good quality with a reduced disintegration of the materials to be assembled from the fact of the small quantity of liquid involved during the thermal cycle, and which only appears at the level of the surface of junction of the pieces to be assembled.

The assemblages obtained are metallurgically sound, that is to say free of burning, as much in the basis materials as in the neighbourhood of the junction. When the two components are alloys of Al, subsequent putting into solution leads to a perfectly homogeneous-structure, in which the zone of junction is no longer visible in microscopy.

The invention will be better understood with the help of the following examples, illustrated by FIGS. 1–5.

EXAMPLE 1

Figure 1:
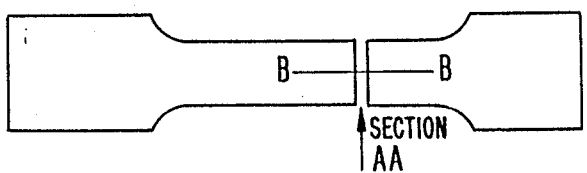
FIG. 1 represents the test-piece used, for the Al-1% Si alloy.

Brazing of Al-1% Si, without filler metal $T_s = 600°$ C. $T_e = 577°$ C. $T_v = 515°$ C. Tensile test-pieces of Al alloy with 1% by weight of Si of 4 mm thickness, 10 mm width and of 79 mm usable length were cut out in rectangular sections. The two surfaces to be joined were obtained by section along AA (FIG. 1) across the test-pieces. The two test-piece halves were then put into solution for 3 hours at 530° C., then slowly cooled at 20° C./hour, down to the ambient temperature. It is the slow cooling down between 515° C. ($T_v$) and 76° C. ($2/5$ $T_s=349K$), for a period of 22 hours which constituted the treatment of the invention.

The two test-piece halves were then placed in contact through their cross-sections under a pressure of 80 kPa.

The whole was then brazed, while being taken to 595° C. for 5 minutes in a salt bath for brazing aluminium, and cooled down in calm air.

Figure 2:
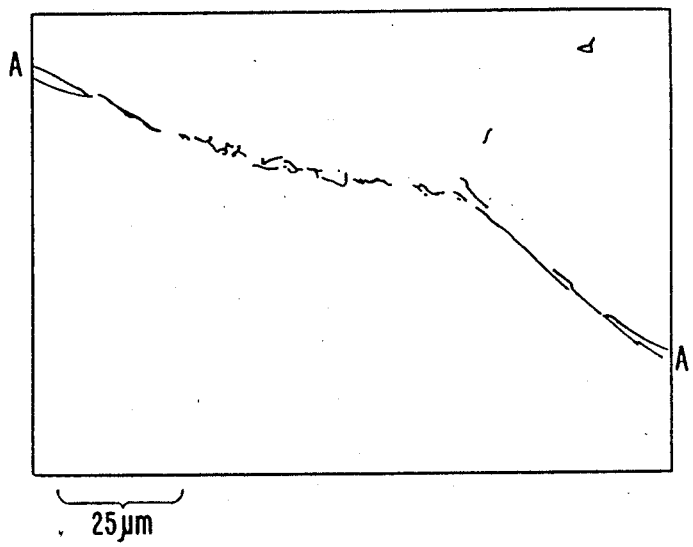
FIG. 2 represents the zone of brazing of the two elements of the above test-piece above along the section BB of FIG. 1.

FIG. 2 represents a micrography of the joint surface after brazing; it is confirmed that there has certainly been local fusion of the two surfaces in contact and formation of the eutectic Al Si at the junction of 2 test-piece halves. After putting into solution for 3 hours at 530° C. and quenching, the tension test-piece thus reconstituted presents the same mechanical characteristics of tension as those of basis metal Al-1% Si, the zone of junction no longer being visible under microscopy.

It may be confirmed that no local fusion occurred in the body of the ½ test-pieces.

EXAMPLE 2

Brazing of 6060 without filler metal $T_s=625°$ C. $T_e=595°$ C. $T_v=520°$ C. Two elements of 6060 alloy (according to the designation of the Aluminium Association) were brought to 530° C. for 1 hour and slowly cooled, at 10° C./h down to the ambient temperature. The alloy thus remains for 43 hours between $T_v=520°$ C. and 86° C. ($2/5T_s=359K$) in order to be subjected to the treatment of the invention. These were placed in contact under a pressure of 45kPa.

The whole was then brazed while being brought to 603° C. for 5 minutes while in a salt bath for brazing aluminium and cooled down again in calm air. After putting into solution for 1 hour at 530° C., quenching, and aging over 8 hours to 175° C., the assemblage presents a homogeneous hardness of 70 Vickers, in the zone of brazing or in the base alloy.

Figure 3:
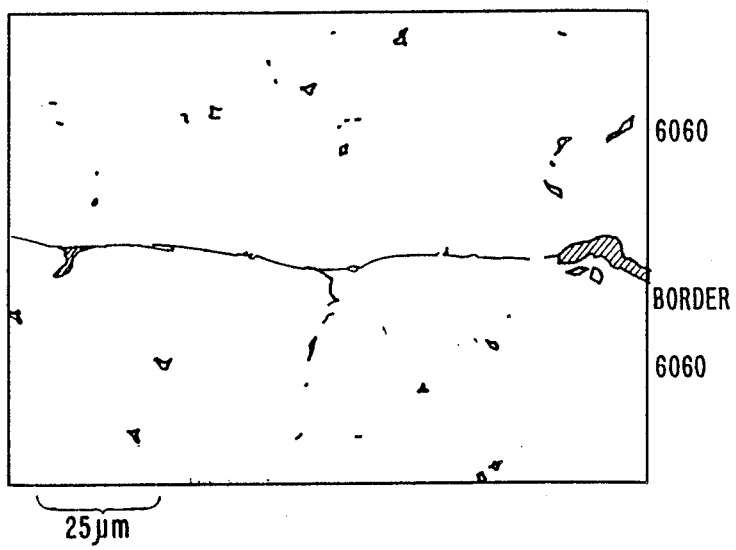
FIG. 3 represents a micrographic transversal section on the bond 6060/6060 (following the designations of the Aluminium Association).

FIG. 3 represents a micrographic section of the bond; this is marked by a fine precipitation of composites Al-Fe-Si.

EXAMPLE 3

Brazing of 2011 without filler metal $T_s=560°$ C. $T_e=548°$ C. $T_v=560°$ C. Two elements of alloy 2011 according to the designation of the Aluminium Association, of the following composition (in % by weight): Cu: 5.4—Fe: 0.29—Si: 0.07—Pb: 0.60—Bi: 0.60 were brought for 1 hour to 530° C. and slowly cooled at 10° C./h, down to the ambient temperatures. The cooling down from 520° C. ($T_v$) to 61° C. ($2/5T_s=334K$) which took 46 hours constituted the treatment of the invention.

The two elements were placed in contact under a pressure of 45 kPa. The whole was then brought to 553° C. for 5 minutes in a salt bath for brazing aluminium, then cooled down in calm air.

After putting into solution for 1 hour at 530° C., quenching and aging over 8 hours at 160° C., the zone of bonding presents the same hardness as the base alloy, that is 110 Vickers.

Figure 4:
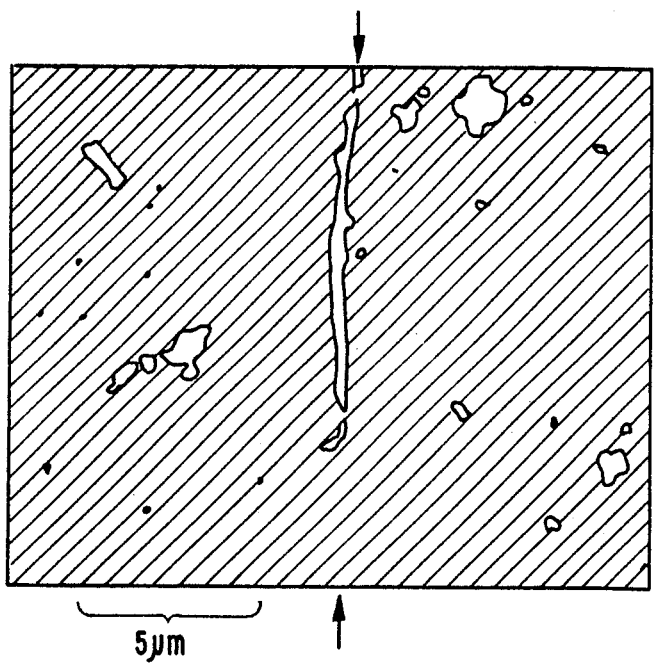
FIG. 4 represents an electronic image of the zone of bonding 2011/2011 (according to the designations of the Aluminium Association).

FIG. 4 represents an electronic image of the zone of bonding: the phase present at the interface is $Al_2 Cu$.

EXAMPLE 4

Brazing without filler metal of a 6060 alloy on a stainless ferritic steel containing 17% Cr with molybdenum.

One element of alloy 6060 of composition (% by weight): Mg: 0.45—Si: 0.40—Fe: 0.20 the rest Al was put into solution for 1 hour at 530° C. and slowly cooled at 10° C./h, down to the ambient temperature. It thus remained between 520° C. ($T_v$) and 86° C. ($2/5T_s=359$ K) for 43 hours.

Figure 5:
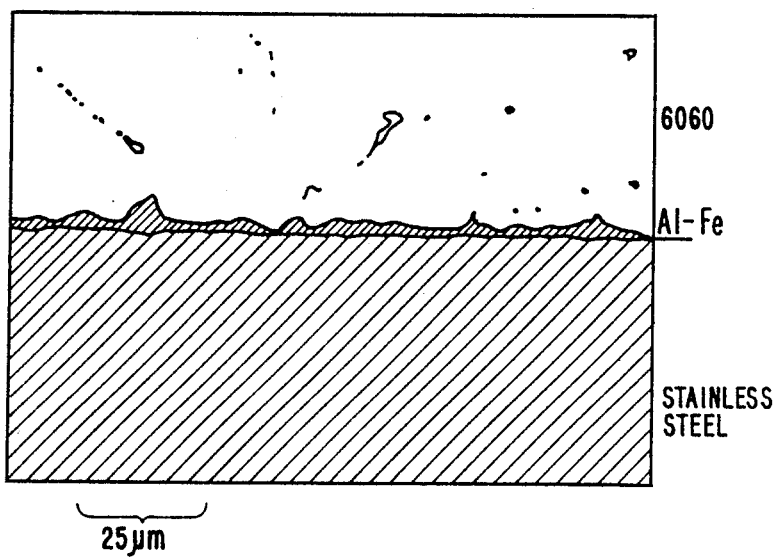
FIG. 5 represents a micrographic section of the zone of bonding 6060/ stainless steel.

It was placed in contact with the element of stainless steel under a pressure of 500 kPa. The assemblage was then brought for 5 minutes to 603° C. in a salt bath for brazing, cooled down in calm air. After putting into solution for 1 hour at 530° C., quenching, and aging 8h at 170° C., the bond obtained is given in FIG. 5. The constituent present in the joint is a compound (Al-Fe).

EXAMPLE 5

Brazing of aluminium 2017 without filler alloy $T_s=530°$ C. $T_e=513°$ C. $T_v=500°$ C. Small plates were put into solution for 1 hour at 510° C., then slowly cooled at a rate of 10° C./h, down to the ambient temperature. They remained thus for 45 hours between 500° C. ($T_v$) and 48° C. ($2/5T_s=321K$). The brazing was realized at 520° C. and gave excellent results.

The assemblages obtained according to the invention and including at least one aluminium based alloy are easily and completely put back into solution by contrast with classic brazing. In the case of brazing of two identical Al-based alloys.

the mechanical properties or the resistance to corrosion are perfectly homogeneous in the base alloy and at the level of the junction.

What is claimed is:

1. Method of brazing without filler metal of two components of which at least one is of Al alloy, comprising the steps of;
   (a) before brazing, maintaining a component of Al alloy in a region of temperatures included between the temperature of solvus of said Al alloy and 2/5 of the temperature of fusion of said Al alloy expressed in °Kelvin, for a time greater than or equal to the time minimum of one of the TTP curves of said Al alloy, P being either a mechanical characteristic, or the sensitivity to corrosion; and
   (b) assembling said components and brazing in a region of temperatures included between the temperature of the most fusible eutectic corresponding to the equilibrium diagram of the constituents of the Al alloy and that of solidus of said Al alloy.

2. Method according to claim 1, wherein the duration of treatment (a) is greater than or equal to the smaller of the durations defined by the TTP curves themselves.

3. Method according to one of claims 1 or 2 where the treatment (a) is isothermal.

4. Method according to claim 1 or 2 where the component is brought to a temperature greater than $2/5T_s$, then cooled down again at a speed such that the piece remains in the zone of temperature $T_v$-$2/5T_s$ for a period at least equal to the minimum duration required according to (a).

5. Method according to claim 4, where the alloy of the component is placed in metallurgical solution and where the thermal treatment (a) takes place during the controlled cooling which follows.

6. Method according to claim 1 or 2, wherein the operation of brazing is followed by placing the article in metallurgical solution.

7. Assemblage obtained according to the method of claim 1 or 2, wherein said assemblage is metallurgically sound.

8. Assemblage obtained according to the method of claim 6, wherein said two components are alloys of Al and the structure of said assemblage is perfectly homogeneous.

9. A method according to claim 1, wherein said brazing takes place with the assembly under a pressure of 0 to 500 kPa.

* * * * *